Patented Nov. 30, 1937

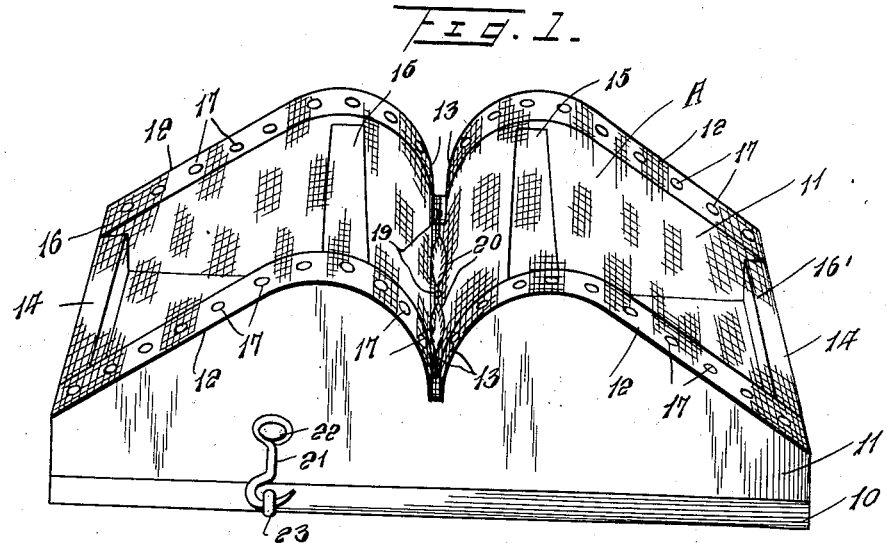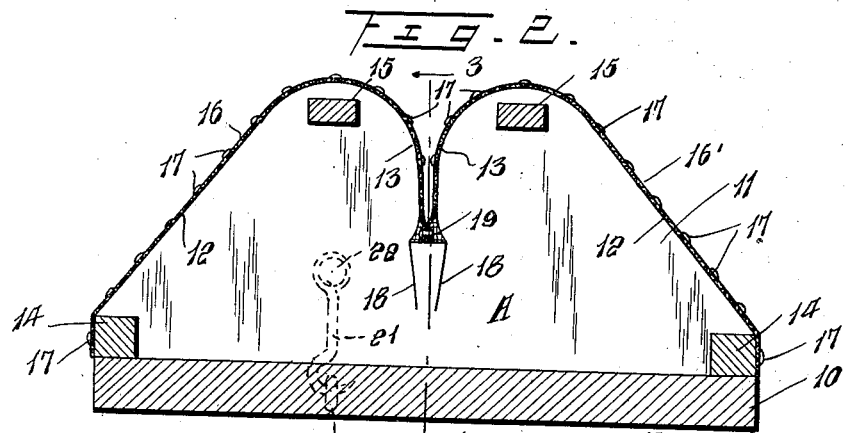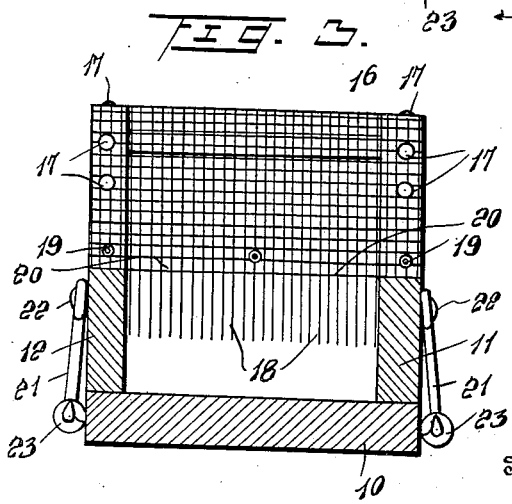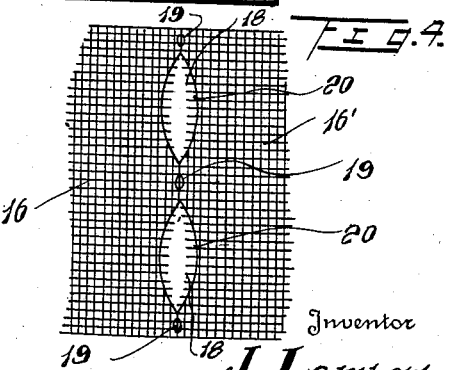

2,100,966

UNITED STATES PATENT OFFICE 2,100,966

INSECT TRAP

Joseph Lambert, Pittsburg, Kans.

Application May 19, 1936, Serial No. 80,622

2 Claims. (Cl. 43—121)

This invention relates to insect traps.

The primary object of the invention is to provide a trap having an entrance readily accessible to insects to permit their entrance to the trap but at the same time to prevent them leaving the trap.

Another advantage of the invention resides in the simplicity of construction and the resulting ease with which the base can be removed to clean the trap.

Other objects and advantages of the invention will become apparent from the drawing and the following description.

In the drawing:—

Figure 1 is a perspective view of the trap;

Figure 2 is a vertical sectional view approximately through the center of the trap;

Figure 3 is a cross sectional view on the line 3—3 of Figure 2, and

Figure 4 is a fragmentary top plan view of the entrance.

In the drawing similar reference characters are used to designate corresponding parts in all of the views. The trap is provided with a removable base 10, and a trap chamber A having side walls 11 with their ends inclined upwardly towards their middle portions as shown at 12.

The upper middle portions of the walls are curved inwardly and downwardly into substantial V-shaped recesses as shown at 13.

The ends of walls 11 are connected by an end wall 14, and 15 designates braces connecting and bracing the walls adjacent to the V-shaped recesses 13.

Strips of wire screen fabric 16 and 16' are secured to end walls 14 and to the top edges of walls 11 by means of driven fastenings 17. The adjacent ends of the strips 16 and 16' are located in the recesses 13 and have the longitudinal wires extended and exposed as shown at 18 by removal of the interlaced cross wires for the purpose hereinafter stated.

The meeting ends of the strips of screen fabric 16 and 16' are connected at intervals by means of rivets 19 or the like, and the edges of the strips between the fastenings 19 are spread to provide entrances 20 into the trap chamber A.

It will be apparent that the insects will crawl up the inclined surfaces from the ends of the trap and then down through the openings 20, attracted by a suitable bait on the base 10, the extended wires 18 not impeding entrance into the chamber A, but that said wires 18 will effectually baffle retreat from the trap through said openings 20.

To remove the entrapped insects it is only necessary to remove the hooks 21 from the eyebolts 23 and lift the trap off of the base.

It is to be understood that the above presents only the preferred embodiment of the invention, and various changes and modifications can be made without departing from the spirit and scope of the invention.

I claim as my invention:—

1. In an insect trap, a trapping chamber having side walls inclined upwardly from their ends then downwardly to form V-shaped portions at their middles, screen wire fabrics for the trap chamber secured to said walls, the adjacent ends of said screen fabrics terminating between said V-shaped portions and being connected by spaced rivets to provide entrance openings, and the screen fabrics terminating in longitudinal strands extending into the trap chamber to prevent the return of insects.

2. An insect trap, comprising a base, side and end walls, said side walls being inclined upwardly from their ends then downwardly to form V shaped portions at their middles, sections of wire fabric secured to the walls and having their adjacent ends terminating in said V shaped portions, and said adjacent ends being connected by fastening means at spaced intervals to form entrances therebetween.

JOSEPH LAMBERT.